United States Patent
Walston et al.

(10) Patent No.: US 10,370,985 B2
(45) Date of Patent: Aug. 6, 2019

(54) FULL HOOP BLADE TRACK WITH AXIALLY KEYED FEATURES

(71) Applicant: Rolls-Royce Corporation, Indianapolis, IN (US)

(72) Inventors: Jeffrey A. Walston, Indianapolis, IN (US); Aaron D. Sippel, Zionsville, IN (US); John A. Weaver, Indianapolis, IN (US); David J. Thomas, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 839 days.

(21) Appl. No.: 14/972,568

(22) Filed: Dec. 17, 2015

(65) Prior Publication Data

US 2016/0177753 A1 Jun. 23, 2016

Related U.S. Application Data

(60) Provisional application No. 62/096,191, filed on Dec. 23, 2014.

(51) Int. Cl.
| | | |
|---|---|---|
| F01D 5/28 | (2006.01) | |
| F01D 25/24 | (2006.01) | |
| F01D 11/12 | (2006.01) | |
| F01D 11/08 | (2006.01) | |
| F01D 9/04 | (2006.01) | |
| F01D 5/30 | (2006.01) | |

(52) U.S. Cl.
CPC .......... *F01D 5/3023* (2013.01); *F01D 5/284* (2013.01); *F01D 9/04* (2013.01); *F01D 11/08* (2013.01); *F01D 11/122* (2013.01); *F01D 25/246* (2013.01); *Y02T 50/672* (2013.01)

(58) Field of Classification Search
CPC .......... F01D 5/284; F01D 5/3023; F01D 9/04; F01D 11/08; F01D 11/122; F01D 25/246; Y02T 50/672
See application file for complete search history.

(56) References Cited

U.S. PATENT DOCUMENTS

| | | |
|---|---|---|
| 3,601,414 A | 8/1971 | Rao |
| 4,087,199 A | 5/1978 | Hemsworth et al. |
| 4,477,086 A | 10/1984 | Feder et al. |
| 4,646,810 A | 3/1987 | Lardellier |
| 4,679,981 A | 7/1987 | Guibert et al. |

(Continued)

FOREIGN PATENT DOCUMENTS

| | | |
|---|---|---|
| DE | 102008044450 A1 | 2/2009 |
| EP | 1965030 A2 | 9/2008 |

(Continued)

OTHER PUBLICATIONS

Extended European Search Report, European Application No. 15200304.2-1610, dated May 13, 2016, 6 pages.

(Continued)

*Primary Examiner* — Igor Kershteyn
(74) *Attorney, Agent, or Firm* — Barnes & Thornburg LLP

(57) ABSTRACT

A turbine shroud for a gas turbine engine includes an annular metallic carrier, a blade track, and a cross-key connection formed between the annular metallic carrier and the ceramic blade track. The cross-key connection locates the ceramic blade track relative to the metallic carrier.

20 Claims, 6 Drawing Sheets

(56) References Cited

U.S. PATENT DOCUMENTS

| | | | |
|---|---|---|---|
| 4,863,345 A | 9/1989 | Thompson et al. | |
| 5,163,809 A | 11/1992 | Akgun et al. | |
| 5,738,490 A | 4/1998 | Pizzi | |
| 6,142,731 A | 11/2000 | Dewis et al. | |
| 6,315,519 B1 | 11/2001 | Bagepalli et al. | |
| 6,517,313 B2 | 2/2003 | Rogers | |
| 6,726,448 B2 | 4/2004 | McGrath et al. | |
| 6,733,233 B2 | 5/2004 | Jasklowski et al. | |
| 6,758,386 B2 | 7/2004 | Marshall et al. | |
| 6,758,653 B2 | 7/2004 | Morrison | |
| 6,896,483 B2 | 5/2005 | Dierksmeier et al. | |
| 6,910,853 B2 | 6/2005 | Corman et al. | |
| 7,090,459 B2 | 8/2006 | Bhate et al. | |
| 7,195,452 B2 | 3/2007 | Allan et al. | |
| 7,217,089 B2 | 5/2007 | Durocher et al. | |
| 7,234,306 B2 | 6/2007 | Aumont et al. | |
| 7,374,396 B2 | 5/2008 | Martin et al. | |
| 7,435,049 B2 | 10/2008 | Ghasripoor et al. | |
| 7,641,442 B2 | 1/2010 | Denece et al. | |
| 7,665,960 B2 | 2/2010 | Shi et al. | |
| 7,686,575 B2 | 3/2010 | Chehab et al. | |
| 7,771,160 B2 | 8/2010 | Shi et al. | |
| 7,914,256 B2 | 3/2011 | Xie et al. | |
| 7,988,395 B2 | 8/2011 | Steffier | |
| 8,047,773 B2 | 11/2011 | Bruce et al. | |
| 8,061,977 B2 | 11/2011 | Keller et al. | |
| 8,079,807 B2 | 12/2011 | Shapiro et al. | |
| 8,092,160 B2 | 1/2012 | Shi et al. | |
| 8,167,546 B2 | 5/2012 | Shi et al. | |
| 8,235,670 B2 | 8/2012 | Morrison et al. | |
| 8,257,029 B2 | 9/2012 | Habarou et al. | |
| 8,322,983 B2 | 12/2012 | Marini | |
| 8,328,505 B2 | 12/2012 | Shi et al. | |
| 8,496,431 B2 | 7/2013 | Habarou et al. | |
| 8,511,975 B2 | 8/2013 | Shi et al. | |
| 8,555,647 B2 | 10/2013 | Dimascio et al. | |
| 8,568,091 B2 | 10/2013 | McCaffrey | |
| 8,651,497 B2 | 2/2014 | Tholen et al. | |
| 8,684,689 B2 | 4/2014 | Guo et al. | |
| 8,739,547 B2 | 6/2014 | Jarmon et al. | |
| 8,740,552 B2 | 6/2014 | Marusko et al. | |
| 8,770,931 B2 | 7/2014 | Alvanos et al. | |
| 8,784,052 B2 | 7/2014 | Shi et al. | |
| 8,790,067 B2 | 7/2014 | McCaffrey et al. | |
| 8,801,372 B2 | 8/2014 | Shi et al. | |
| 8,814,173 B2 | 8/2014 | Motzkus et al. | |
| 8,834,106 B2 | 9/2014 | Luczak | |
| 8,926,270 B2 | 1/2015 | Karafillis et al. | |
| 9,011,079 B2 | 4/2015 | Coign et al. | |
| 9,062,551 B2 | 6/2015 | Simonet | |
| 2004/0047726 A1 | 3/2004 | Morrison | |
| 2005/0158168 A1 | 7/2005 | Bruce et al. | |
| 2009/0208322 A1 | 8/2009 | McCaffrey | |
| 2009/0272122 A1* | 11/2009 | Shi | F01D 11/24 60/785 |
| 2010/0104433 A1* | 4/2010 | Shi | F01D 9/04 415/200 |
| 2010/0111678 A1 | 5/2010 | Habarou et al. | |
| 2010/0150703 A1 | 6/2010 | Gonzalez et al. | |
| 2010/0232941 A1 | 9/2010 | Smoke et al. | |
| 2011/0052384 A1 | 3/2011 | Shi et al. | |
| 2011/0057394 A1 | 3/2011 | Halling | |
| 2011/0150635 A1 | 6/2011 | Motzkus et al. | |
| 2011/0274538 A1 | 11/2011 | Shi et al. | |
| 2012/0070276 A1 | 3/2012 | Shi et al. | |
| 2012/0107107 A1 | 5/2012 | Chan et al. | |
| 2012/0156029 A1 | 6/2012 | Karafillis et al. | |
| 2012/0177488 A1 | 7/2012 | Corman | |
| 2012/0247124 A1 | 10/2012 | Shapiro et al. | |
| 2012/0263582 A1 | 10/2012 | Foster et al. | |
| 2012/0301269 A1 | 11/2012 | Alvanos et al. | |
| 2012/0301312 A1 | 11/2012 | Berczik et al. | |
| 2012/0301303 A1 | 12/2012 | Alvanos et al. | |
| 2012/0308367 A1 | 12/2012 | Luczak | |
| 2013/0008176 A1 | 1/2013 | Shi et al. | |
| 2013/0011248 A1 | 1/2013 | Croteau et al. | |
| 2013/0177384 A1 | 7/2013 | Coign et al. | |
| 2013/0177411 A1 | 7/2013 | Weber et al. | |
| 2014/0202168 A1 | 7/2014 | Shapiro et al. | |
| 2014/0260320 A1 | 9/2014 | Graves et al. | |
| 2014/0271144 A1 | 9/2014 | Landwehr et al. | |
| 2015/0044044 A1 | 2/2015 | Sippel et al. | |
| 2016/0123171 A1 | 5/2016 | Westphal et al. | |
| 2016/0177786 A1 | 6/2016 | Sippel et al. | |
| 2016/0208635 A1 | 7/2016 | Vetters et al. | |
| 2016/0222812 A1 | 8/2016 | Sippel et al. | |

FOREIGN PATENT DOCUMENTS

| | | |
|---|---|---|
| EP | 2299061 A2 | 3/2011 |
| EP | 2589774 A1 | 5/2013 |
| EP | 2604805 A2 | 6/2013 |
| FR | 2580033 A1 | 10/1986 |
| FR | 2980235 A1 | 3/2013 |
| FR | 2980235 B1 | 4/2015 |
| GB | 2235730 A | 3/1991 |
| GB | 2468768 A | 9/2010 |
| GB | 2480766 A | 11/2011 |
| JP | 09250304 A | 9/1997 |
| JP | 09264104 A | 10/1997 |
| WO | 2010058137 A1 | 5/2010 |
| WO | 2011157956 A1 | 12/2011 |
| WO | 2014120334 A1 | 8/2014 |
| WO | 2014143225 A1 | 9/2014 |
| WO | 2014163674 A1 | 10/2014 |

OTHER PUBLICATIONS

Corman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.

Blosser, Max L.; Thermal Stress in High Temperature Cylindrical Fasteners; NASA Technical Memorandum; May 1988; pp. 1-12.

Blosser, Max Land McWithey, Robert R.; Theoretical Basis for Design of Thermal-Stress-Free Fasteners; NASA Technical Paper; Dec. 1983; pp. 1-26.

International Search Report and the Written Opinion for International Application No. PCT/US2013/072578, dated Dec. 2, 2013, (11 pages).

* cited by examiner

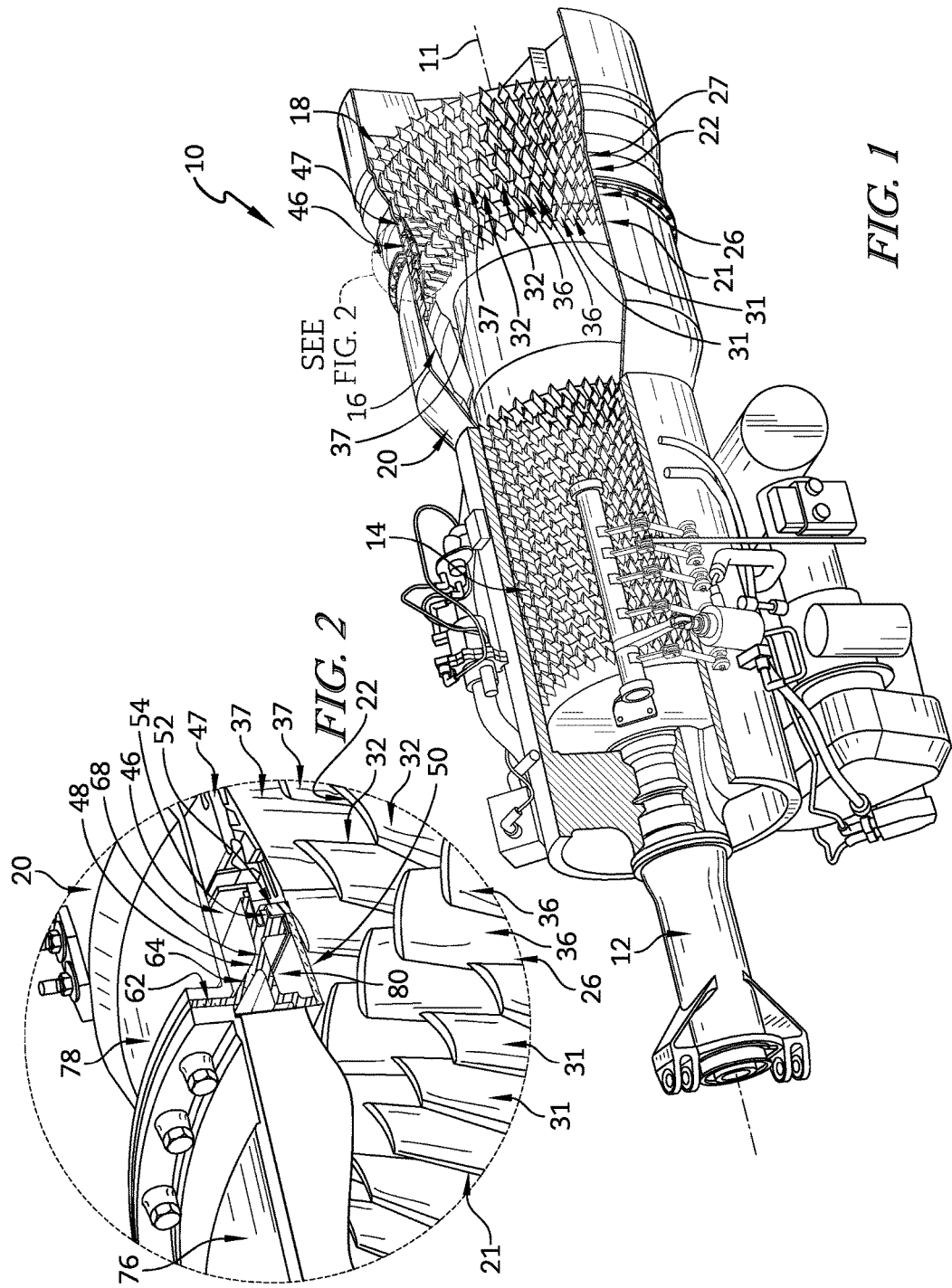

FULL HOOP BLADE TRACK WITH AXIALLY KEYED FEATURES

CROSS REFERENCE TO RELATED APPLICATIONS

This application claims priority to and the benefit of U.S. Provisional Patent Application No. 62/096,191, filed 23 Dec. 2014, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. For example, coupling such components with traditional fasteners such as rivets or bolts may not allow for the differing levels of expansion and contraction during operation of the gas turbine engine.

SUMMARY

The present application discloses one or more of the features recited in the appended claims and/or the following features which, alone or in any combination, may comprise patentable subject matter.

According to the present disclosure, a turbine shroud for use in a gas turbine engine having a central axis is taught. The turbine shroud may include an annular metallic carrier, a one-piece annular ceramic runner concentric with the annular metallic carrier that extends around the central axis, and a cross-key connection formed between the annular metallic carrier and the one-piece annular ceramic blade track. The cross-key connection may be adapted to locate the one-piece annular ceramic runner relative to the annular metallic carrier.

In illustrative embodiments, the cross-key connection may include a plurality of keys and a plurality of corresponding keyways that receive the plurality of keys. The plurality of keys may extend in an axial direction from the one-piece annular ceramic runner parallel to the central axis. The plurality of corresponding keyways may be formed in the annular metallic carrier.

In illustrative embodiments, the one-piece ceramic runner may include ceramic matrix material and ceramic-containing reinforcements suspended in the ceramic matrix material. The ceramic matrix material may include silicon-carbide and the ceramic-containing reinforcements may include silicon-carbide. The ceramic-containing reinforcements may include plies of reinforcing fabric that extends around the central axis.

In illustrative embodiments, the plurality of keys may be integral with the one-piece annular ceramic runner. Each of the plurality of keys may comprise ceramic matrix material and ceramic-containing reinforcements suspended in the ceramic matrix material.

In illustrative embodiments, the plurality of keys may extend from an aft side of the one-piece annular ceramic runner into the plurality of corresponding keyways. The plurality of keys and the one-piece annular ceramic runner may have about the same thickness when viewed from a forward side of the runner.

In illustrative embodiments, the shroud may include a plurality of insulator tabs. The insulator tabs may extend in an axial direction from the one-piece annular ceramic runner parallel to the central axis circumferentially between the plurality of keys and radially inward of a portion of the annular metallic carrier. The plurality of insulator tabs may insulate at least some of the annular metallic carrier from hot gasses during use of the turbine shroud within a gas turbine engine.

In illustrative embodiments, the plurality of insulator tabs may be integral with the one-piece annular ceramic runner. Each of the plurality of insulator tabs may comprise ceramic matrix material and ceramic-containing reinforcements suspended in the ceramic matrix material.

In illustrative embodiments, the plurality of keys and the one-piece annular ceramic runner may have about the same thickness when viewed from a forward side of the runner. The plurality of insulator tabs may be thinner than the one-piece annular ceramic runner when viewed from a forward side of the runner.

In illustrative embodiments, the plurality of keys may extend from an aft side of the one-piece annular ceramic runner into the plurality of corresponding keyways. The plurality of insulator tabs may extend from the aft side of the one-piece annular ceramic runner circumferentially between the plurality of keyways without being received in the plurality of keyways.

According to another aspect of the present disclosure, a blade track for a gas turbine engine is taught. The blade track may include a one-piece annular ceramic runner that extends around a central axis and a plurality of keys that extend in an axial direction from the one-piece annular ceramic runner parallel to the central axis. The one-piece annular ceramic runner may comprise ceramic matrix material and ceramic-containing reinforcements suspended in the ceramic matrix material.

In illustrative embodiments, the ceramic matrix material may include silicon-carbide. The ceramic-containing reinforcements may also include silicon-carbide.

In illustrative embodiments, the ceramic-containing reinforcements may include plies of reinforcing fabric that extends around the central axis. The plurality of keys may be integral with the one-piece annular ceramic runner. Each of the plurality of keys may comprise ceramic matrix material and woven plies of ceramic-containing reinforcement suspended in the ceramic matrix material. The plurality of keys and the one-piece annular ceramic runner may have about the same thickness when viewed from a forward side of the runner.

In illustrative embodiments, a plurality of insulator tabs may extend in an axial direction from the one-piece annular ceramic runner parallel to the central axis circumferentially between the plurality of keys. The plurality of insulator tabs may be integral with the one-piece annular ceramic runner. Each of the plurality of insulator tabs may comprise ceramic matrix material and ceramic-containing reinforcements suspended in the ceramic matrix material.

In illustrative embodiments, the plurality of keys and the one-piece annular ceramic runner may have about the same thickness when viewed from a forward side of the runner. The plurality of insulator tabs may be thinner than the one-piece annular ceramic runner when viewed from a forward side of the one-piece annular runner.

According to yet another aspect of the present disclosure, a method of locating a ceramic blade track relative to a metallic carrier is disclosed. The method may include rotating the ceramic blade track to a predetermined orientation relative to the metallic retainer, nesting the ceramic blade track in a space formed by the metallic retainer so that the ceramic blade track is concentric with the metallic retainer, and inserting a plurality of keys extending in an axial direction from the ceramic blade track into a corresponding plurality of keyways formed in the metallic carrier to thereby establish a cross-key connection between the ceramic blade track and the metallic carrier.

In illustrative embodiments, the ceramic blade track may include a plurality of insulator tabs that extend in an axial direction from the one-piece annular ceramic runner parallel to the central axis. The insulator tabs may be arranged circumferentially between the plurality of keys radially inward of a portion of the annular metallic carrier so that the plurality of insulator tabs insulate at least some of the annular metallic carrier from hot gasses during use of the turbine shroud within a gas turbine engine when the ceramic blade track is nested with the metallic carrier.

In illustrative embodiments, the ceramic blade track may include a one-piece annular runner. The plurality of keys and the one-piece annular runner may have about the same thickness when viewed from a forward side of the one-piece annular runner. The plurality of insulator tabs may be thinner than the one-piece annular runner when viewed from a forward side of the runner.

These and other features of the present disclosure will become more apparent from the following description of the illustrative embodiments.

BRIEF DESCRIPTION OF THE DRAWINGS

FIG. 1 is a cut-away perspective view of a gas turbine engine including a turbine section;

FIG. 2 is a detail view of FIG. 1 showing a turbine shroud providing a track for blades of a turbine wheel assembly;

DETAILED DESCRIPTION OF THE DRAWINGS

Figure 3:
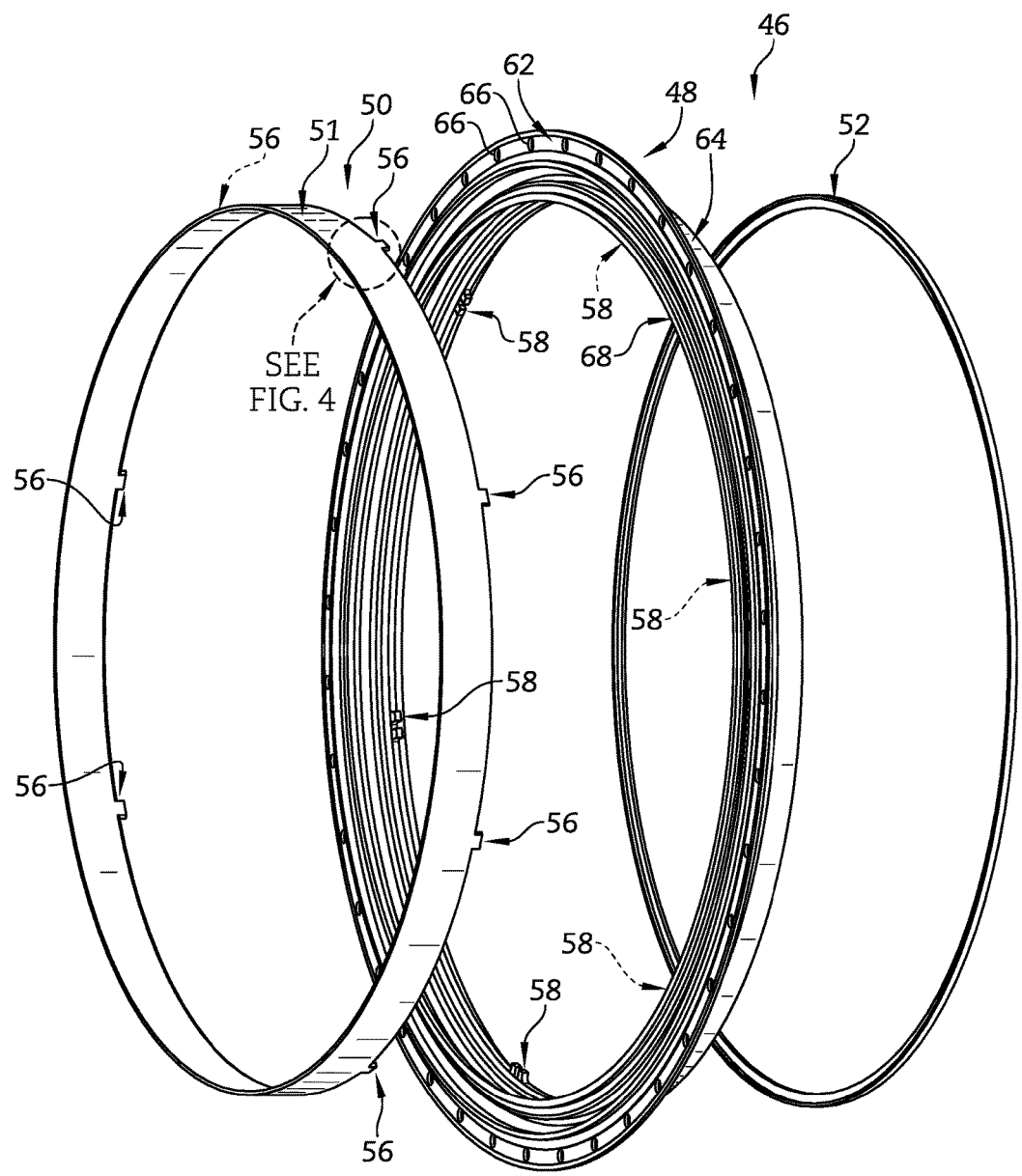
FIG. 3 is an exploded perspective view of the turbine shroud included in the gas turbine engine shown in FIGS. 1 and 2 showing that the turbine shroud includes a carrier, a blade track, and a retainer.

For the purposes of promoting an understanding of the principles of the disclosure, reference will now be made to a number of illustrative embodiments illustrated in the drawings and specific language will be used to describe the same.

FIG. 1 is an illustrative aerospace gas turbine engine 10 cut-away to show that the engine 10 includes an output shaft 12, a compressor 14, a combustor 16, and a turbine 18 all mounted to a case 20. The output shaft 12 is configured to be coupled to a propeller and is driven by the turbine 18. The compressor 14 compresses and delivers air to the combustor 16. The combustor 16 mixes fuel with the compressed air received from the compressor 14 and ignites the fuel. The hot high pressure products of the combustion reaction in the combustor 16 are directed into the turbine 18 and the turbine 18 extracts work to drive the compressor 14 and the output shaft 12.

The turbine 18 illustratively includes static turbine vane assemblies 21, 22, a turbine wheel assembly 26 as shown in FIGS. 1 and 2. Each vane assembly 21, 22 includes a plurality corresponding of vanes 31, 32 and the turbine wheel assembly 26 includes a plurality of corresponding blades 36. The vanes 31, 32 of the vane assembly 21 direct the combustion products from the combustor 16 toward the blades 36 of the turbine wheel assemblies 26. The blades 36 are in turn pushed by the combustion products to cause the turbine wheel assembly 26 to rotate; thereby, driving the rotating components of the compressor 14 and/or the output shaft 12.

The turbine 18 also includes a turbine shroud 46 that extends around the turbine wheel assembly 26 to block combustion products from passing over the blades 36 without pushing the blades 36 to rotate. The exemplary first stage turbine shroud 46, shown in FIG. 2, extends around the first stage turbine wheel assembly 26 and is sized to block most combustion products from passing over the blades 36 without pushing the blades 36 to rotate. Combustion products that are allowed to pass over the blades 36 do not push the blades 36 and such passed-over products contribute to lost performance within the engine 10.

The turbine shroud 46 illustratively includes a carrier 48, a blade track (sometimes called seal ring) 50, and a retainer 52 as shown in FIGS. 2 and 3. The carrier 48 is an annular, round metallic component and is configured to support the blade track 50 in position adjacent to the blades 36 of the turbine wheel assembly 26. The illustrative blade track 50 is concentric with and nested into the carrier 48 along a rotational axis 11 of the engine 10. The retainer 52 engages both the carrier 48 and the blade track 50 to position the carrier 48 and the blade track relative to other static turbine components. In some embodiments, the carrier 48 may be made up of a number of segments that extend only part-way around the axis 11.

In the illustrative embodiment, the blade track 50 includes an annular runner 51 as shown in FIG. 3. The annular runner 51 is a unitary component forming a full hoop. The annular runner 51 is a component of one-piece, continuous construction, rather than as a series of joined segments. This construction eliminates gaps that may be formed between parts of a multi-piece (or segmented) runner. The one-piece full hoop of the annular runner 51 encourages uniform radial expansion of the blade track 50 at high temperatures. Uniform radial expansion of the blade track 50 allows the blade track 50 to remain round at high temperatures which results in the ability to further maintain a small gap between the blades 36 and the blade track 50 while hot combustion products are being directed over the blades 36 and the blade track 50.

The annular runner 51 is illustratively made from a ceramic material; and, more particularly, a ceramic matrix composite (CMC) including silicon carbide fibers and silicon carbide matrix. The annular runner 51 shown includes a number of reinforcement plies wrapped around the axis. In other embodiments, the runner 51 may include chopped fiber reinforcements, strand reinforcements, or other types of reinforcement. For purposes of this application, a ceramic material is any monolithic ceramic or composite in which at least one constituent is a ceramic. In other embodiments, the annular runner 51 may be made of other metallic, non-metallic, or composite materials with low coefficients of thermal expansion.

The annular runner 51 has a relatively low coefficient of thermal expansion because of its composition. Considering the relatively small coefficient of thermal expansion, the annular runner 51 can be designed to maintain a small gap between the blade track 50 and the blades 36 thereby improving performance of the engine 10.

Figure 5:
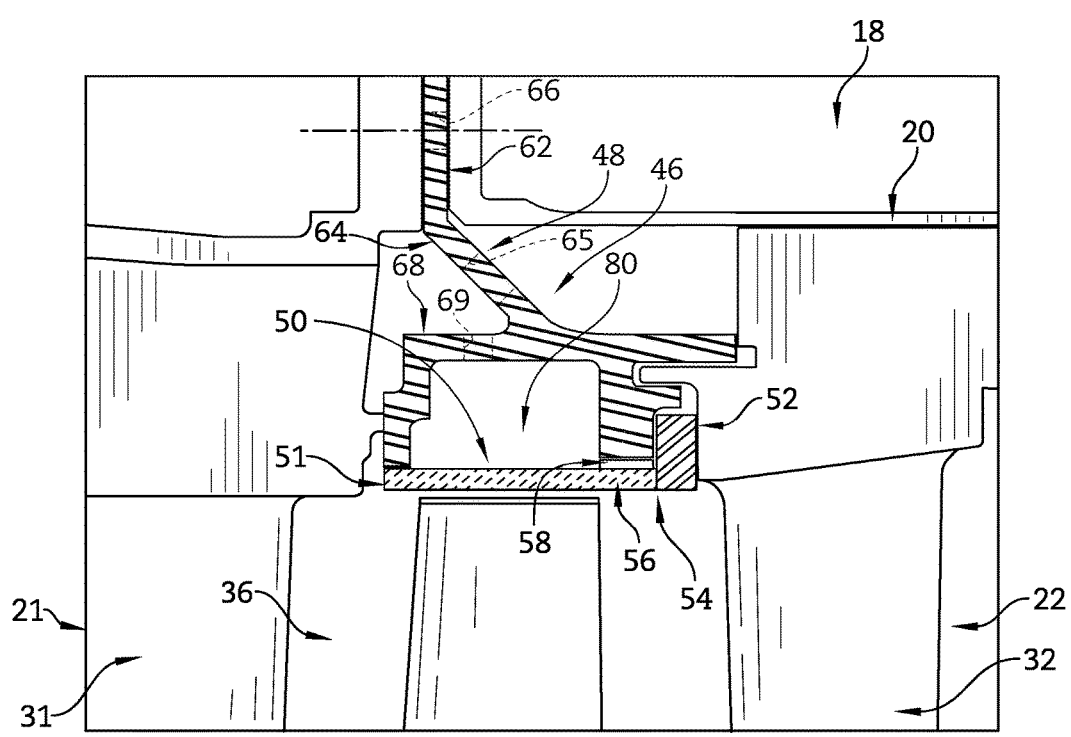
FIG. 5 is a partial cross-sectional view of the gas turbine engine of FIG. 1 showing the arrangement of the turbine shroud in the gas turbine engine.

To accommodate the connection of the CMC blade track 50 to the metallic carrier 48 (which has a relatively high coefficient of thermal expansion), the turbine shroud 46 includes a cross-key connection 54 that is formed between the carrier 48 and the blade track 50 as shown, for example, in FIGS. 2 and 5. The cross-key connection 54 locates the annular runner 51 relative to the carrier 48 while allowing radial movement between the blade track 50 and the carrier 48. The cross-key connection 54 illustratively includes a plurality of keys 56 and a plurality of corresponding keyways 58 sized and arranged to receive the plurality of keys 56.

In the illustrative embodiment, the keys 56 extend axially aft from the back side of the runner 51 and are circumferentially spaced from one another as shown in FIG. 3. The keys 56 are co-processed (densified) with the runner 51 such that the keys 56 are integral with the annular runner 51. In the illustrative embodiment, the keys 56 have a thickness that is generally equal to the thickness of the runner 51 when viewed from a forward side of the runner 51.

Figure 4:
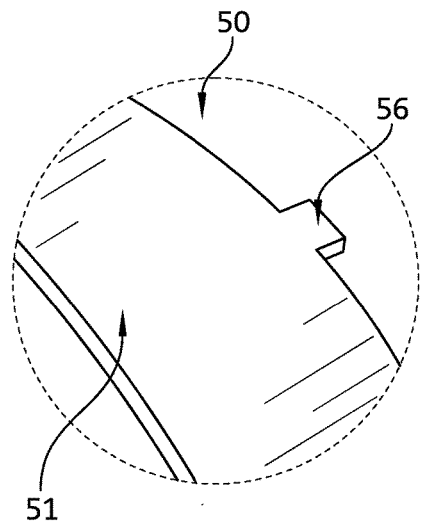
FIG. 4 is a detail view of the blade track of FIG. 3 showing that the blade track includes an annular runner that forms a full hoop and a number of rectangular keys that extend axially from the annular runner.
Figure 4A:
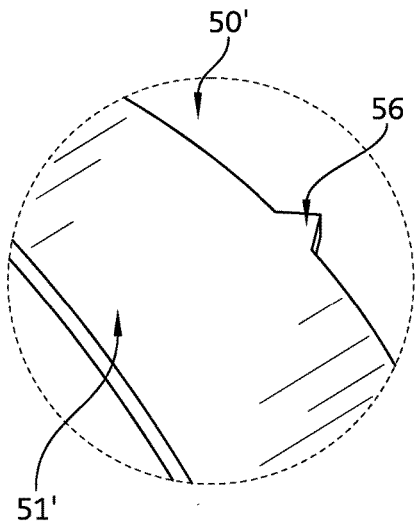
FIG. 4A is a view similar to FIG. 4 of an alternative blade track adapted for use in a turbine shroud in which the keys have a triangular shape.

The keys 56 are illustratively made from a ceramic material; and, more particularly, a ceramic matrix composite (CMC) including silicon carbide fibers and silicon carbide matrix. In the embodiment shown, the keys 56 are generally rectangular in shape as shown in FIG. 4 and include a number of reinforcement plies. In other embodiments, the keys may be generally triangular as suggested by keys 56' included in alternative annular runner 50' shown in FIG. 4A or may have other shapes with non-axially aligned edges. In some embodiments, the keys 56 may include chopped fiber reinforcements, strand reinforcements, or other types of reinforcement.

Referring again to FIG. 3, the carrier 48 is illustratively formed to include a connection flange 62, a connector 64, and a support band 68. The connection flange 62 is formed to include a bolt-hole pattern 66 adapted to be bolted between a combustor-case section 76 and a turbine-case section 78 included in the case 20. In another embodiment, the connection flange 62 could be hung from the case rather than bolted. The connector 64 extends inwardly in the radial direction and rearwardly in an axial direction from the connection flange 62 to form a frustoconical shape. The support band 68 extends inwardly in the radial direction from the connector 64 and the connection flange 62.

The support band 68 forms a radially-inwardly-opening channel 80 that faces the blade track 50 as shown in FIG. 5. The downwardly-opening channel 80 is exposed to fluid communication with air radially outwardly of the blade track 50 via a vent hole pattern 69 formed in the support band 68 and a vent hole pattern 65 formed in the connector 64. In the illustrative embodiment, the plurality of keyways 58 extend outward in the radial direction into the support band 68 and axially through the support band 68 as shown in FIG. 5.

The retainer 52 engages the aft side 82 of the support band 68 and the aft side 71 of the blade track 50 to locate the carrier 48 and the blade track 50 relative to the second stage vane assembly 22.

According to at least one method of assembling the turbine shroud 46, a user rotates the blade track 50 to a predetermined orientation relative to the retainer 48 so that the keys 56 are aligned corresponding keyways 58. Then the user nests the blade track 50 into the retainer 48 so that the blade track 50 is concentric with the retainer. Next, the user inserts the keys 56 of the blade track 50 into the corresponding keyways 58 formed in the carrier 48 to thereby establish the cross-key connection 54 between the blade track 50 and the carrier 48.

Figure 6:
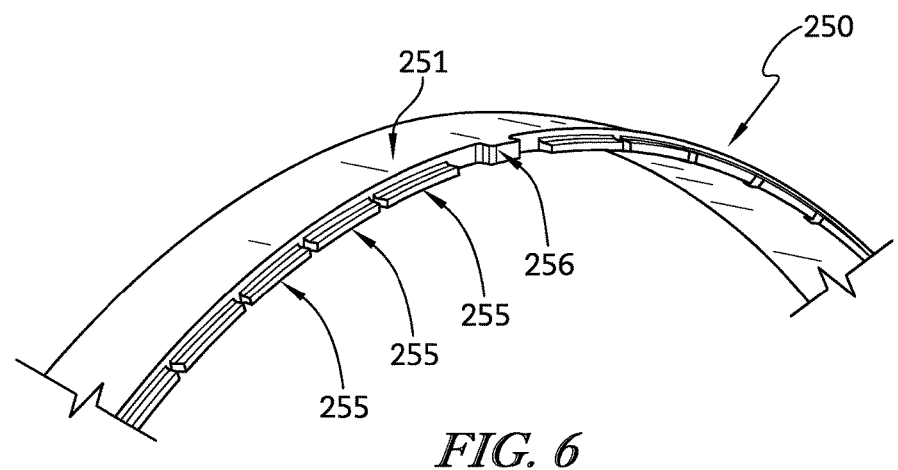
FIG. 6 is a perspective view of a portion of another blade track adapted for use in the gas turbine engine of FIG. 1 showing that the blade track includes an annular runner, a number of keys extending axially from the runner to locate the runner relative to the carrier, and a number of insulating tabs extending axially from the runner to insulate the carrier from a gas path defined by the blade track.
Figure 7:
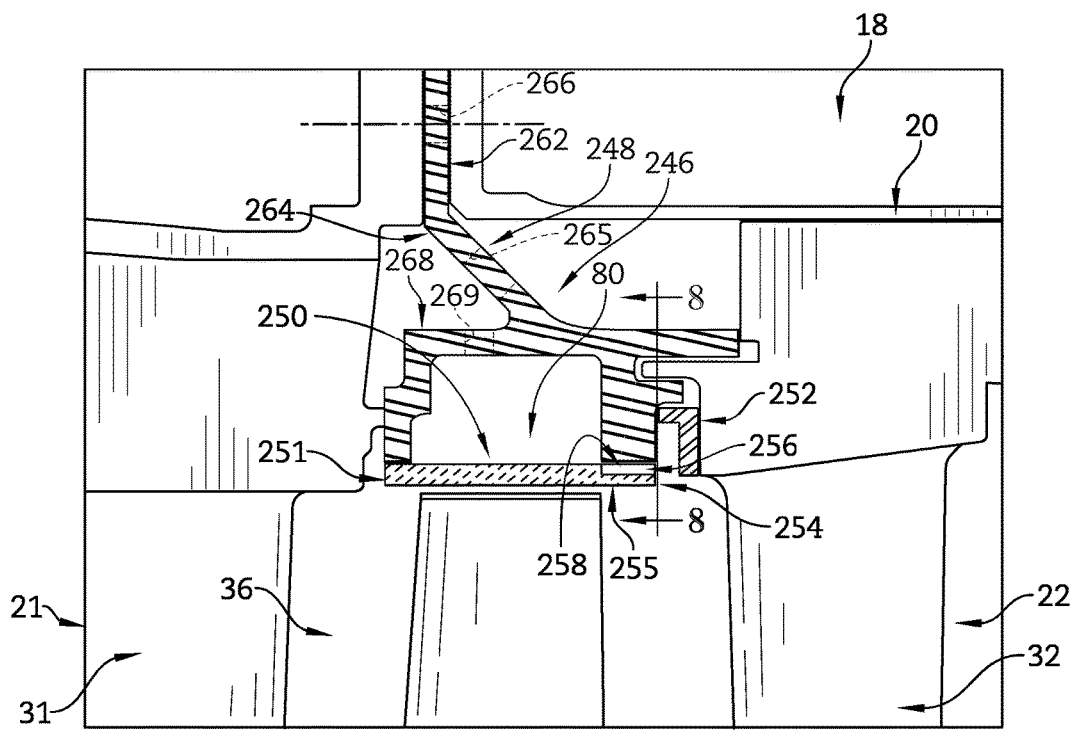
FIG. 7 is a partial cross-sectional view of a gas turbine engine including a turbine shroud incorporating the blade track of FIG. 6.
Figure 8:
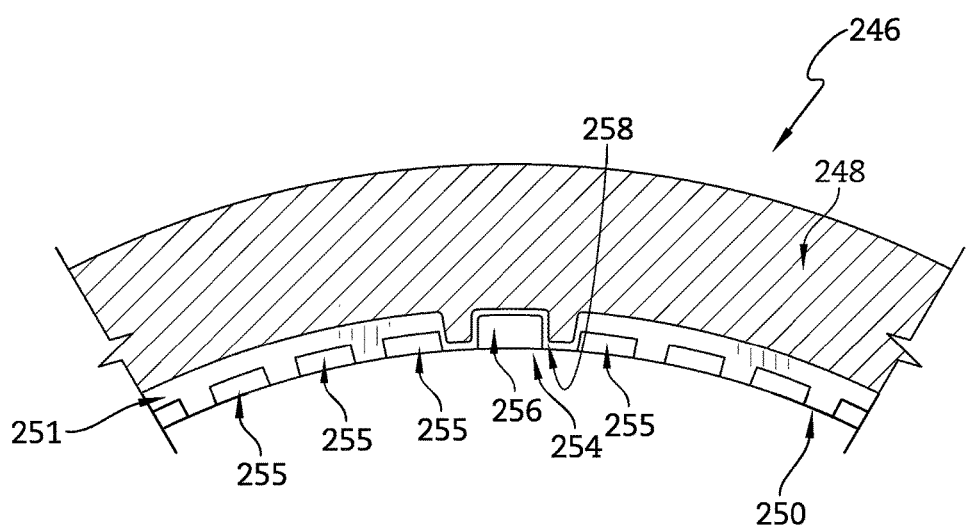
FIG. 8 is an aft elevation view of the turbine shroud of FIG. 7 showing that the insulating tabs are arranged between the carrier and the outer boundary of the gas path defined by the blade track.

Another illustrative turbine shroud 246 is shown in FIGS. 6-8. The turbine shroud 246 is configured for use in engine 10 and is substantially similar to the turbine shroud 46 shown in FIGS. 1-5 and described herein. Accordingly, similar reference numbers in the 200 series indicate features that are common between the turbine shroud 46 and the turbine shroud 246. The description of the engine 10 and the turbine shroud 46 is hereby incorporated by reference to apply to the turbine shroud 246, except in instances when it conflicts with the specific description and drawings of the turbine shroud 246.

Unlike turbine shroud 46, the blade track 250 of the turbine shroud 246 includes a number of insulator tabs 255 adapted to insulate at least some of the annular metallic carrier 248 from hot gasses during use of the turbine shroud 46 within the gas turbine engine 10 as shown in FIGS. 6 and 7. The plurality of insulator tabs 255 each extend in an axial direction from the runner 251 parallel to the central axis 11 circumferentially between the plurality of keys 256 and radially inward of a portion of the annular metallic carrier 248. The insulator tabs 255 illustratively extend from the aft side of the runner 251 and are arranged circumferentially between the keyways 258 without being received in the keyways 258.

In the illustrative embodiment, the insulator tabs 255 are co-processed (densified) with the runner 251 such that the insulator tabs 255 are integral with the annular runner 251. In the illustrative embodiment, the insulator tabs 255 have a thickness that is thinner than the thickness of the runner 251 when viewed from a forward or aft side of the runner 251.

The insulator tabs 255 are illustratively made from a ceramic material; and, more particularly, a ceramic matrix composite (CMC) including silicon carbide fibers and silicon carbide matrix. In the embodiment shown, the insulator tabs 255 include a number of reinforcement plies. In other embodiments, the insulator tabs 255 may include chopped fiber reinforcements, strand reinforcements, or other types of reinforcement.

Figure 9:
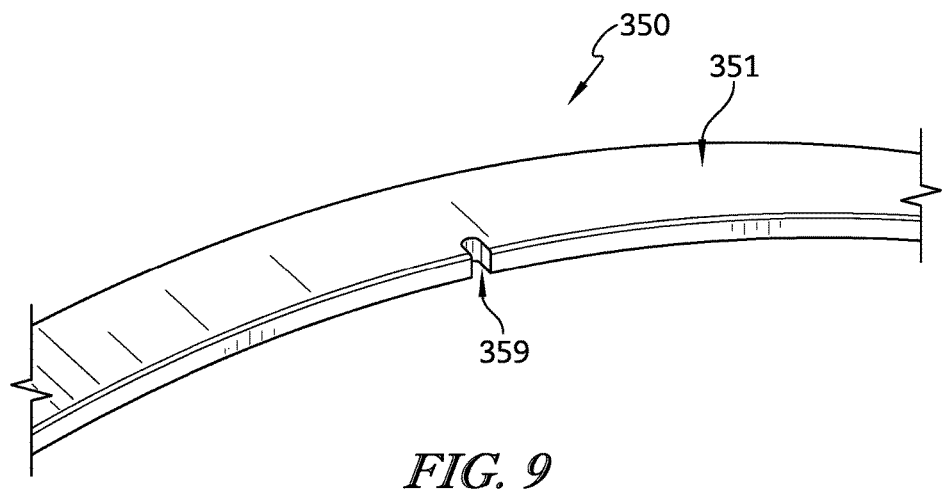
FIG. 9 is a perspective view of a portion of yet another blade track adapted for use in the gas turbine engine of FIG. 1 showing that the blade track includes an annular runner and that the annular runner is formed to include a number of axially-extending keyways extending from an aft side of the annular runner toward the forward side of the annular runner.
Figure 10:
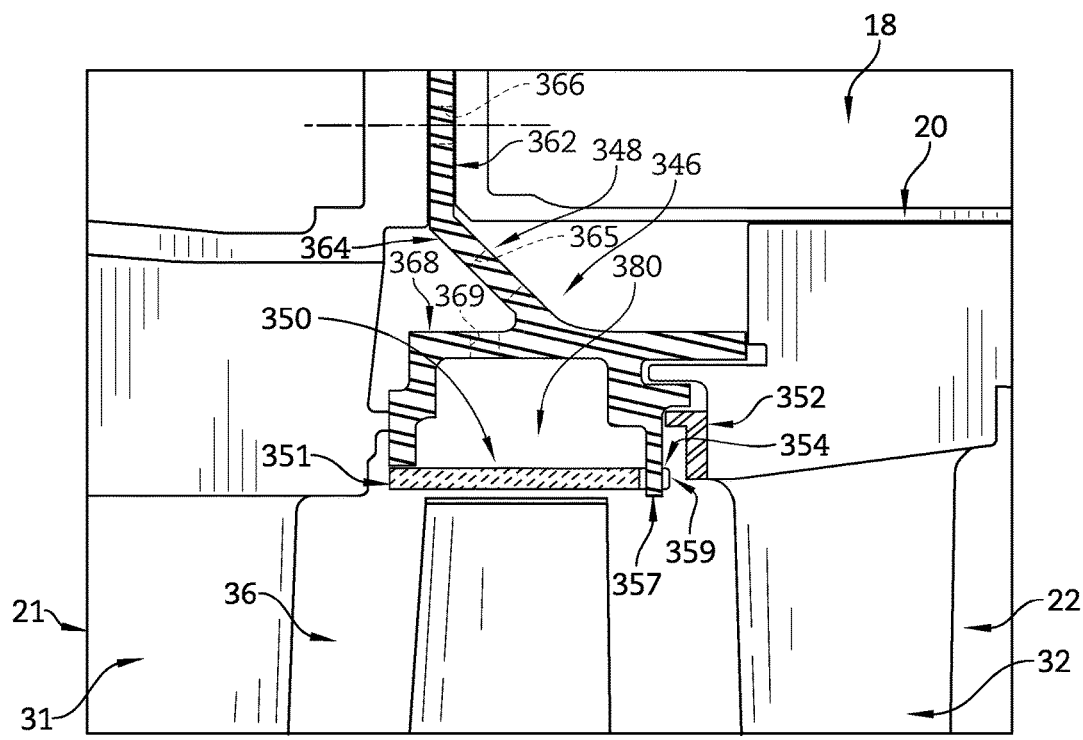
FIG. 10 is a partial cross-sectional view of a gas turbine engine including a turbine shroud incorporating the blade track of FIG. 9 showing that the keyways receive keys included in the carrier so that the runner is located relative to the shroud.

Another illustrative turbine shroud 346 is shown in FIG. 10. The turbine shroud 346 is configured for use in engine 10 and is substantially similar to the turbine shroud 46 shown in FIGS. 1-10 and described herein. Accordingly, similar reference numbers in the 300 series indicate features that are common between the turbine shroud 46 and the turbine shroud 346. The description of the engine 10 and the turbine shroud 46 is hereby incorporated by reference to apply to the turbine shroud 346, except in instances when it conflicts with the specific description and drawings of the turbine shroud 346.

Unlike turbine shroud 46, the turbine shroud 346 does not include keys but rather is formed to include keyways 359 that extend axially into the annular runner 351 from the aft side of the runner 351 as shown in FIG. 9. The keyways 359 extend radially through the runner 351 and receive keys 357 formed by the metallic carrier 348 to form a cross key connection 354 as shown in FIG. 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud for use in a gas turbine engine having a central axis, the turbine shroud comprising
an annular metallic carrier,
a one-piece annular ceramic runner concentric with the annular metallic carrier that extends around the central axis, the one-piece annular ceramic runner having a surface that faces radially outward away from the central axis, and
a cross-key connection formed between the annular metallic carrier and the one-piece annular ceramic blade track to locate the one-piece annular ceramic runner relative to the annular metallic carrier, the cross-key connection including a plurality of keys and a plurality of corresponding keyways that receive the plurality of keys,
wherein the plurality of keys extend in an axial direction from the one-piece annular ceramic runner parallel to the central axis without extending radially outward from the surface and the plurality of corresponding keyways that are formed in the annular metallic carrier.

2. The turbine shroud of claim 1, wherein the one-piece ceramic runner comprises ceramic matrix material and ceramic-containing reinforcements suspended in the ceramic matrix material.

3. The turbine shroud of claim 2, wherein the ceramic matrix material includes silicon-carbide and the ceramic-containing reinforcements include silicon-carbide.

4. The turbine shroud of claim 2, wherein the ceramic-containing reinforcements include plies of reinforcing fabric that extends around the central axis.

5. The turbine shroud of claim 2, wherein the plurality of keys are integral with the one-piece annular ceramic runner and each of the plurality of keys comprises ceramic matrix material and ceramic-containing reinforcements suspended in the ceramic matrix material.

6. The turbine shroud of claim 1, wherein the plurality of keys extend from an aft side of the one-piece annular ceramic runner into the plurality of corresponding keyways.

7. The turbine shroud of claim 6, wherein the plurality of keys and the one-piece annular ceramic runner have about the same thickness when viewed from a forward side of the runner.

8. A turbine shroud for use in a gas turbine engine having a central axis, the turbine shroud comprising
an annular metallic carrier,
a one-piece annular ceramic runner concentric with the annular metallic carrier that extends around the central axis,
a cross-key connection formed between the annular metallic carrier and the one-piece annular ceramic blade track to locate the one-piece annular ceramic runner relative to the annular metallic carrier, the cross-key connection including a plurality of keys and a plurality of corresponding keyways that receive the plurality of keys, and
a plurality of insulator tabs that extend in an axial direction from the one-piece annular ceramic runner parallel to the central axis circumferentially between the plurality of keys and radially inward of a portion of the annular metallic carrier so that the plurality of insulator tabs insulate at least some of the annular metallic carrier from hot gasses during use of the turbine shroud within a gas turbine engine,
wherein the plurality of keys extend in the axial direction from the one-piece annular ceramic runner parallel to the central axis and the plurality of corresponding keyways that are formed in the annular metallic carrier.

9. The turbine shroud of claim 8, wherein the plurality of insulator tabs are integral with the one-piece annular ceramic runner and each of the plurality of insulator tabs comprises ceramic matrix material and ceramic-containing reinforcements suspended in the ceramic matrix material.

10. The turbine shroud of claim 8, wherein the plurality of keys and the one-piece annular ceramic runner have about the same thickness when viewed from a forward side of the runner and the plurality of insulator tabs are thinner than the one-piece annular ceramic runner when viewed from a forward side of the runner.

11. The turbine shroud of claim 8, wherein the plurality of keys extend from an aft side of the one-piece annular ceramic runner into the plurality of corresponding keyways and the plurality of insulator tabs also extend from the aft side of the one-piece annular ceramic runner circumferentially between the plurality of keyways without being received in the plurality of keyways.

12. A blade track for a gas turbine engine, the blade track comprising
   a one-piece annular ceramic runner that extends around a central axis and that comprises ceramic matrix material and ceramic-containing reinforcements suspended in the ceramic matrix material, the one-piece annular ceramic runner having a surface that faces radially outward away from the central axis, and
   a plurality of keys that extend in an axial direction from the one-piece annular ceramic runner parallel to the central axis without extending radially outward from the surface.

13. The blade track of claim 12, wherein the ceramic matrix material includes silicon-carbide and the ceramic-containing reinforcements include silicon-carbide.

14. The blade track of claim 12, wherein the ceramic-containing reinforcements include plies of reinforcing fabric that extends around the central axis.

15. The blade track of claim 14, wherein the plurality of keys are integral with the one-piece annular ceramic runner and each of the plurality of keys comprises ceramic matrix material and woven plies of ceramic-containing reinforcements suspended in the ceramic matrix material.

16. The blade track of claim 15, wherein the plurality of keys and the one-piece annular ceramic runner have about the same thickness when viewed from a forward side of the runner.

17. A blade track for a gas turbine engine, the blade track comprising
   a one-piece annular ceramic runner that extends around a central axis and that comprises ceramic matrix material and ceramic-containing reinforcements suspended in the ceramic matrix material,
   a plurality of keys that extend in an axial direction from the one-piece annular ceramic runner parallel to the central axis, and
   a plurality of insulator tabs that extend in an axial direction from the one-piece annular ceramic runner parallel to the central axis circumferentially between the plurality of keys.

18. The blade track of claim 17, wherein the plurality of insulator tabs are integral with the one-piece annular ceramic runner and each of the plurality of insulator tabs comprises ceramic matrix material and ceramic-containing reinforcements suspended in the ceramic matrix material.

19. The blade track of claim 17, wherein the plurality of keys and the one-piece annular ceramic runner have about the same thickness when viewed from a forward side of the runner and the plurality of insulator tabs are thinner than the one-piece annular ceramic runner when viewed from a forward side of the one-piece annular runner.

20. A method of locating a ceramic blade track having a surface that faces radially outward away from a central axis relative to a metallic carrier, the method comprising
   rotating the ceramic blade track to a predetermined orientation relative to the metallic carrier,
   nesting the ceramic blade track in a space formed by the metallic carrier so that the ceramic blade track is concentric with the metallic carrier, and
   inserting a plurality of keys extending in an axial direction from the ceramic blade track without extending radially outward from the surface into a corresponding plurality of keyways formed in the metallic carrier to thereby establish a cross-key connection between the ceramic blade track and the metallic carrier.

* * * * *